United States Patent
Watanabe et al.

(10) Patent No.: US 10,641,790 B2
(45) Date of Patent: May 5, 2020

(54) SCANNING PROBE MICROSCOPE

(71) Applicant: Shimadzu Corporation, Kyoto (JP)

(72) Inventors: Kazuma Watanabe, Kyoto (JP); Keita Fujino, Kyoto (JP); Eiji Iida, Kyoto (JP); Masato Hirade, Kyoto (JP); Kenji Yamasaki, Kyoto (JP); Hideo Nakajima, Kyoto (JP); Yuichiro Ikeda, Kyoto (JP); Hiroshi Arai, Kyoto (JP)

(73) Assignee: Shimadzu Corporation, Nakagyo-ku, Kyoto-shi, Kyoto (JP)

( * ) Notice: Subject to any disclaimer, the term of this patent is extended or adjusted under 35 U.S.C. 154(b) by 0 days.

(21) Appl. No.: 16/290,334

(22) Filed: Mar. 1, 2019

(65) Prior Publication Data
US 2019/0324053 A1    Oct. 24, 2019

(30) Foreign Application Priority Data
Apr. 18, 2018   (JP) .................. 2018-080133

(51) Int. Cl.
*G01Q 10/04* (2010.01)
(52) U.S. Cl.
CPC ................... *G01Q 10/04* (2013.01)
(58) Field of Classification Search
CPC .................................... G01Q 10/04
USPC ................... 850/1, 2, 3, 4, 5, 6, 7
See application file for complete search history.

(56) References Cited

U.S. PATENT DOCUMENTS

| | | | | |
|---|---|---|---|---|
| 6,078,044 A | * | 6/2000 | Yasutake | B82Y 35/00 250/442.11 |
| 8,321,960 B2 | * | 11/2012 | Ito | G01Q 30/06 850/1 |
| 2001/0032496 A1 | | 10/2001 | Watanabe | |

(Continued)

FOREIGN PATENT DOCUMENTS

| | | |
|---|---|---|
| JP | 2001-194284 A | 7/2001 |
| JP | 2010-175534 A | 8/2010 |

(Continued)

OTHER PUBLICATIONS

Notification of Reasons for Refusal from the Japanese Patent Office dated Aug. 6, 2019, for corresponding Japanese patent application No. JP 2018-080133, submitted with a machine translation.

*Primary Examiner* — Nicole M Ippolito
(74) *Attorney, Agent, or Firm* — Muir Patent Law, PLLC

(57) ABSTRACT

Provided is a scanning probe microscope being able to shorten an observation time of a minute observation object. Main measurement is performed to acquire a surface image of a sample based on a detection signal in a measurement range of a plurality of lines by repeating, for each line, processing of scanning a cantilever at predetermined second intervals in a Y-direction after acquiring the detection signal at predetermined first intervals while scanning the cantilever on a line having a predetermined length along an X-direction. Preliminary measurement is performed to acquire a surface image of the sample by acquiring the detection signal at intervals wider than the first intervals or scanning the cantilever in the Y-direction at intervals wider than the second intervals before the main measurement, the surface image of the sample being coarser than the surface image in the main measurement.

6 Claims, 8 Drawing Sheets

(56) References Cited

U.S. PATENT DOCUMENTS

| | | | |
|---|---|---|---|
| 2009/0140142 A1* | 6/2009 | Murayama | B82Y 35/00 250/307 |
| 2009/0255016 A1* | 10/2009 | Wakiyama | G01Q 70/04 850/33 |
| 2010/0205699 A1 | 8/2010 | Tachizaki et al. | |
| 2010/0325761 A1* | 12/2010 | Nakata | B82Y 15/00 850/33 |
| 2011/0055982 A1 | 3/2011 | Watanabe et al. | |
| 2017/0285067 A1* | 10/2017 | Shigeno | G01Q 10/065 |
| 2019/0183348 A1* | 6/2019 | Onoe | H01L 41/0966 |

FOREIGN PATENT DOCUMENTS

| | | | |
|---|---|---|---|
| JP | 2011-047887 A | 3/2011 | |
| JP | 2014-44144 A | 3/2014 | |

\* cited by examiner

SCANNING PROBE MICROSCOPE

CROSS REFERENCE TO RELATED APPLICATION

This application claims priority to Japanese Patent Application No. 2018-080133 filed on Apr. 18, 2018, the entire disclosure of which is incorporated by reference herein.

BACKGROUND OF THE INVENTION

Field of the Invention

The present invention relates to a scanning probe microscope including a cantilever that is relatively displaced along a surface of a sample.

Description of the Related Art

In an optical lever type scanning probe microscope, a probe of the cantilever is moved along the surface of the sample, and bending of the cantilever is detected, which allows a surface image (uneven image) of the sample to be obtained (for example, refer to JP-A-2014-44144). This type of scanning probe microscope includes a light irradiator that emits light toward the cantilever and a photodetector that receives light reflected from the cantilever.

Processing of scanning the cantilever at predetermined intervals (second intervals) in a sub-scanning direction (Y-direction) after acquiring a detection signal from the photodetector at predetermined intervals (first intervals) while scanning the cantilever on a line having a predetermined length along a main scanning direction (X-direction) is repeated for each line in acquiring the surface image of the sample. Consequently, the surface image of the sample can be acquired based on the detection signal within a measurement range of a plurality of lines.

The cantilever is an extremely small member, and has a narrow range in which the cantilever is scanned with respect to the sample. Thus, the surface image of the whole sample cannot be obtained at once, and a worker needs to search and observe an observation object in the sample from the image in the restricted measurement range in the sample surface. For this reason, the worker repeats alignment of the cantilever with respect to the sample while checking existence of the observation object in the obtained surface image of the sample, whereby the observation object in the sample falls within the measurement range.

SUMMARY OF THE INVENTION

A certain amount of time is required to scan the cantilever in the X-direction and the Y-direction within the measurement range to acquire the surface image of the sample. For this reason, work to repeatedly perform the alignment of the cantilever with respect to the sample as described above to check the existence of the observation object in the surface image of the sample obtained by scanning the cantilever each time is a great burden on the worker, which results in a problem in that time necessary for the observation of the observation object is prolonged.

It is also conceivable that the surface image of the sample is captured with an optical microscope over a wide range, a position of the observation object is specified from the captured image, and the cantilever is scanned such that the position of the observation object falls within the measurement range. However, in the case that the observation object is minute (for example, in the case of a nanometer order size), sometimes such resolution that can specify the position of the observation object does not exist.

The present invention has been made in view of the above circumstances, and an object of the present invention is to provide a scanning probe microscope being able to shorten an observation time of the minute observation object.

(1) The present invention provides a scanning probe microscope including a cantilever, a light irradiator, a photodetector, a scanning processor, a main measurement processor, and a preliminary measurement processor. The cantilever is relatively displaced along the surface of the sample. The light irradiator emits light toward the cantilever. The photodetector outputs a detection signal corresponding to bending of the cantilever by receiving light reflected from the cantilever. The scanning processor performs scanning by relatively displacing the cantilever in an X-direction and a Y-direction relative to the surface of the sample, the X-direction and the Y-direction intersecting each other. The main measurement processor performs main measurement to acquire a surface image of a sample based on a detection signal in a measurement range of a plurality of lines by repeating, for each line, processing of scanning the cantilever at predetermined second intervals in the Y-direction after acquiring the detection signal at predetermined first intervals while scanning the cantilever on a line having a predetermined length along the X-direction. The preliminary measurement processor performs preliminary measurement to acquire a surface image of the sample by acquiring the detection signal at intervals wider than the first intervals or scanning the cantilever in the Y-direction at intervals wider than the second intervals before the main measurement, the surface image of the sample being coarser than the surface image in the main measurement.

With this configuration, in the preliminary measurement, the detection signal is acquired at the intervals wider than the intervals (first intervals) at which the detection signal is acquired along the X-direction in the main measurement, or the cantilever is scanned at the intervals wider than the intervals (second intervals) at which the cantilever is scanned in the Y-direction in the main measurement, which allows the surface image of the sample that is coarser than the surface image in the main measurement to be acquired in a short time. Thus, the existence of the minute observation object in the surface image can be checked in a short time based on the coarse surface image of the sample obtained by the preliminary measurement. For this reason, an observation time of the minute observation object can be shortened by performing the main measurement on the measurement range where the observation object is determined to exist by the preliminary measurement.

(2) The preliminary measurement processor may start the scanning from a central portion of the measurement range.

With this configuration, in the preliminary measurement, instead of acquiring the surface image of the sample over the whole measurement range, the surface image of the sample is acquired in the central portion of the measurement range, and the existence of the minute observation object can be checked in the surface image. Consequently, the preliminary measurement is performed in a short time as compared with the case that the surface image of the sample is acquired over the whole measurement range, so that the observation time of the minute observation object can further be shortened.

(3) The preliminary measurement processor may simultaneously scan the cantilever in the X-direction and the Y-direction.

With this configuration, the surface image of the sample is acquired in the oblique direction with respect to the measurement range by simultaneously scanning the cantilever in the X-direction and the Y-direction, and the existence of the minute observation object can be checked in the surface image. Consequently, the preliminary measurement is performed in a short time as compared with the case that the surface image of the sample is acquired over the whole measurement range, so that the observation time of the minute observation object can further be shortened.

(4) The preliminary measurement processor may repeat processing of scanning the cantilever in the Y-direction after scanning the cantilever in the X-direction on a line shorter than the predetermined length.

With this configuration, the surface image of the sample in the saw-tooth shape with respect to the measurement range is acquired by repeating the processing of scanning the cantilever in the Y-direction after scanning the cantilever in the X-direction on a line shorter than the length of one line in the main measurement, and the existence of the minute observation object can be checked in the surface image. Consequently, the preliminary measurement is performed in a short time as compared with the case that the surface image of the sample is acquired over the whole measurement range, so that the observation time of the minute observation object can further be shortened.

(5) The scanning probe microscope may further include a determination processor that determines existence of an observation object in the surface image of the sample acquired by the preliminary measurement.

With this configuration, the existence of the minute observation object can automatically be determined in the surface image of the sample by the determination processor based on the surface image acquired in the preliminary measurement. Thus, a burden on the worker can be reduced as compared with the case that the worker visually checks the existence of the observation object.

(6) The main measurement processor may perform the main measurement when the determination processor determines that the observation object exists in the surface image of the sample.

With this configuration, the determination processor automatically determines the existence of the minute observation object in the surface image of the sample acquired by the preliminary measurement, and resultantly the main measurement can automatically be performed on the measurement range where the observation object is determined to exist. Consequently, the burden on the worker can further be reduced.

In the present invention, the existence of the minute observation object in the surface image can be checked in a short time based on the coarse surface image of the sample obtained by the preliminary measurement, so that the observation time of the minute observation object can be shortened by performing the main measurement on the measurement range where the existence of the observation object is checked by the preliminary measurement.

DETAILED DESCRIPTION OF THE PREFERRED EMBODIMENT

1. Entire Configuration of Scanning Probe Microscope

Figure 1:
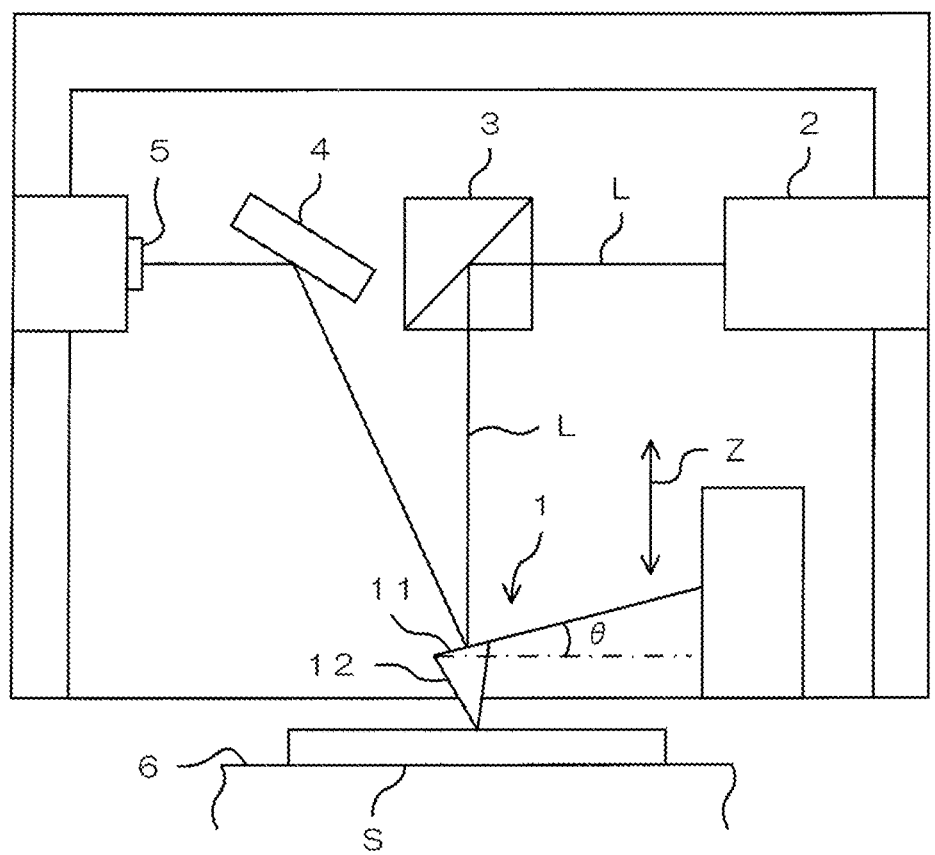
FIG. 1 is a schematic diagram illustrating a configuration example of a scanning probe microscope according to an embodiment of the present invention.

FIG. 1 is a schematic diagram illustrating a configuration example of a scanning probe microscope according to an embodiment of the present invention. The scanning probe microscope (SPM) includes a cantilever 1, a light irradiator 2, a beam splitter 3, a mirror 4, a photodetector 5, and a sample stage 6, and the like. In the scanning probe microscope, a surface image (uneven image) of a sample S placed on the sample stage 6 can be obtained by moving the cantilever 1 along a surface of the sample S.

The light irradiator 2 includes a laser light source such as a semiconductor laser, and emits light toward the cantilever 1. The light emitted from the light irradiator 2 is incident on the cantilever 1 through the beam splitter 3. The cantilever 1 include a reflecting surface 11, and the light reflected on the reflecting surface 11 is reflected by the mirror 4 and received by the photodetector 5. A configuration including a photodiode such as a quadrant photodiode can be adopted as the photodetector 5.

Another optical member such as a collimating lens and a focus lens (neither is illustrated) may be provided in an optical path from the light irradiator 2 to the cantilever 1. In this case, after the light emitted from the light irradiator 2 is changed into parallel light by the collimating lens, the parallel light can be condensed by the focus lens, and guided onto the side of the cantilever 1.

In addition to the beam splitter 3, the collimating lens and the focus lens constitute an optical system that guides the light emitted from the light irradiator 2 to the cantilever 1. The configuration of the optical system is not limited to this configuration, but the optical system may be configured such that at least one of the above optical members is not provided.

For example, the cantilever 1 is an extremely small member having a length of about 150 μm and a width of about 30 to 40 μm. In the cantilever 1, a probe 12 is provided in a surface on an opposite side to the reflecting surface 11. The surface image of the sample S can be obtained by moving the probe 12 along the surface of the sample S.

The reflecting surface 11 of the cantilever 1 is inclined by a predetermined inclination angle θ with respect to a direction orthogonal to an optical axis L of the light emitted from the light irradiator 2. Thus, in the case that the probe 12 of the cantilever 1 is moved along the unevenness of the surface of the sample S, the cantilever 1 is bent to change the inclination angle θ of the reflecting surface 11. At this point, a detection signal from the photodetector 5 changes according to bending of the cantilever 1 by changing a position at which the light reflected from the reflecting surface 11 is received in the photodetector 5, so that the surface image of the sample S can be obtained based on the detection signal from the photodetector 5.

In the embodiment, the cantilever 1 is displaced along the surface of the sample S. Alternatively, the sample S may be displaced with respect to the cantilever 1 by moving the sample stage 6. That is, the cantilever 1 may relatively be displaced along the surface of the sample S.

2. Scanning of Sample Surface

Figure 2:
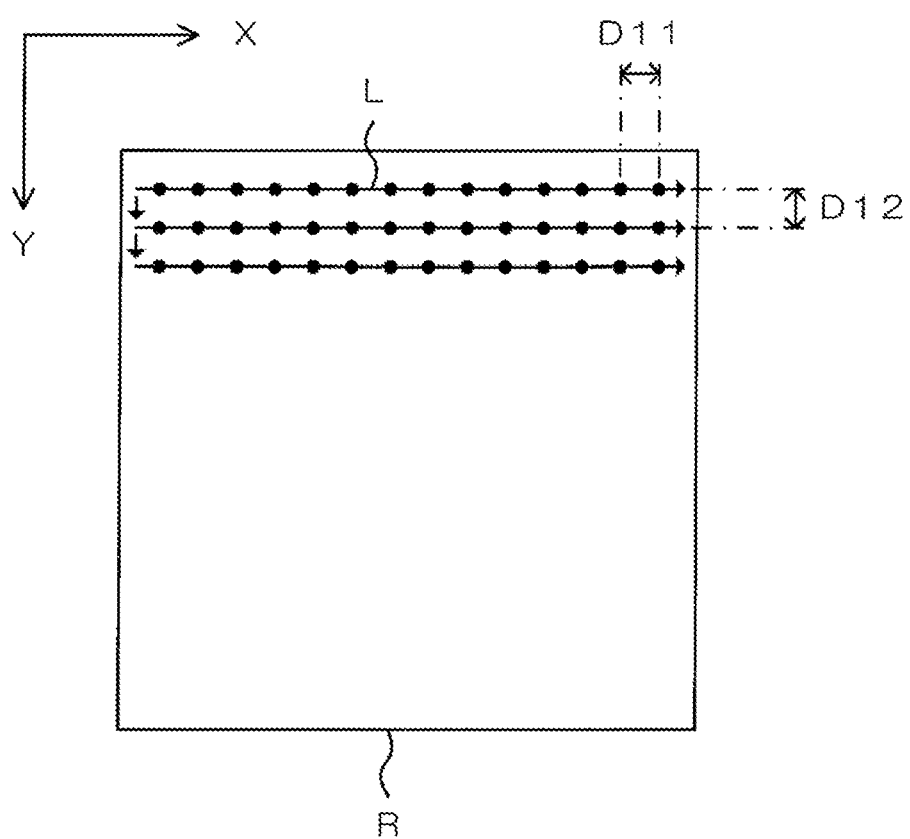
FIG. 2 is a view illustrating a mode in scanning a surface of a sample.

FIG. 2 is a view illustrating a mode in scanning the surface of the sample S. In acquiring the surface image of the sample S, the cantilever 1 is relatively displaced along the surface of the sample S in a main scanning direction (X-direction) and a sub-scanning direction (Y-direction). Consequently, main scanning along the X-direction and sub-scanning along the Y-direction are performed within a predetermined measurement range R. In the embodiment, the X-direction and the Y-direction are orthogonal to each other. However, the present invention is not limited to this configuration, but the X-direction and the Y-direction may intersect each other.

The main scanning is performed by scanning the cantilever 1 on a line L along the X-direction. During the main scanning, the detection signal from the photodetector 5 is acquired at predetermined intervals (first interval) D11. A length of the line L is previously set as a predetermined length corresponding to a width in the X-direction of the measurement range R. The sub-scanning is performed by scanning the cantilever 1 at predetermined intervals (second interval) D12 in the Y-direction every time the main scanning of one line is performed.

In this way, by alternately and repeatedly performing the main scanning along the X-direction and the sub-scanning along the Y-direction, the detection signal from the photodetector 5 is obtained within the measurement range R for the plurality of lines L. The surface image of the sample S in the measurement range R can be acquired based on these detection signals.

3. Electric Configuration of Scanning Probe Microscope

Figure 3:
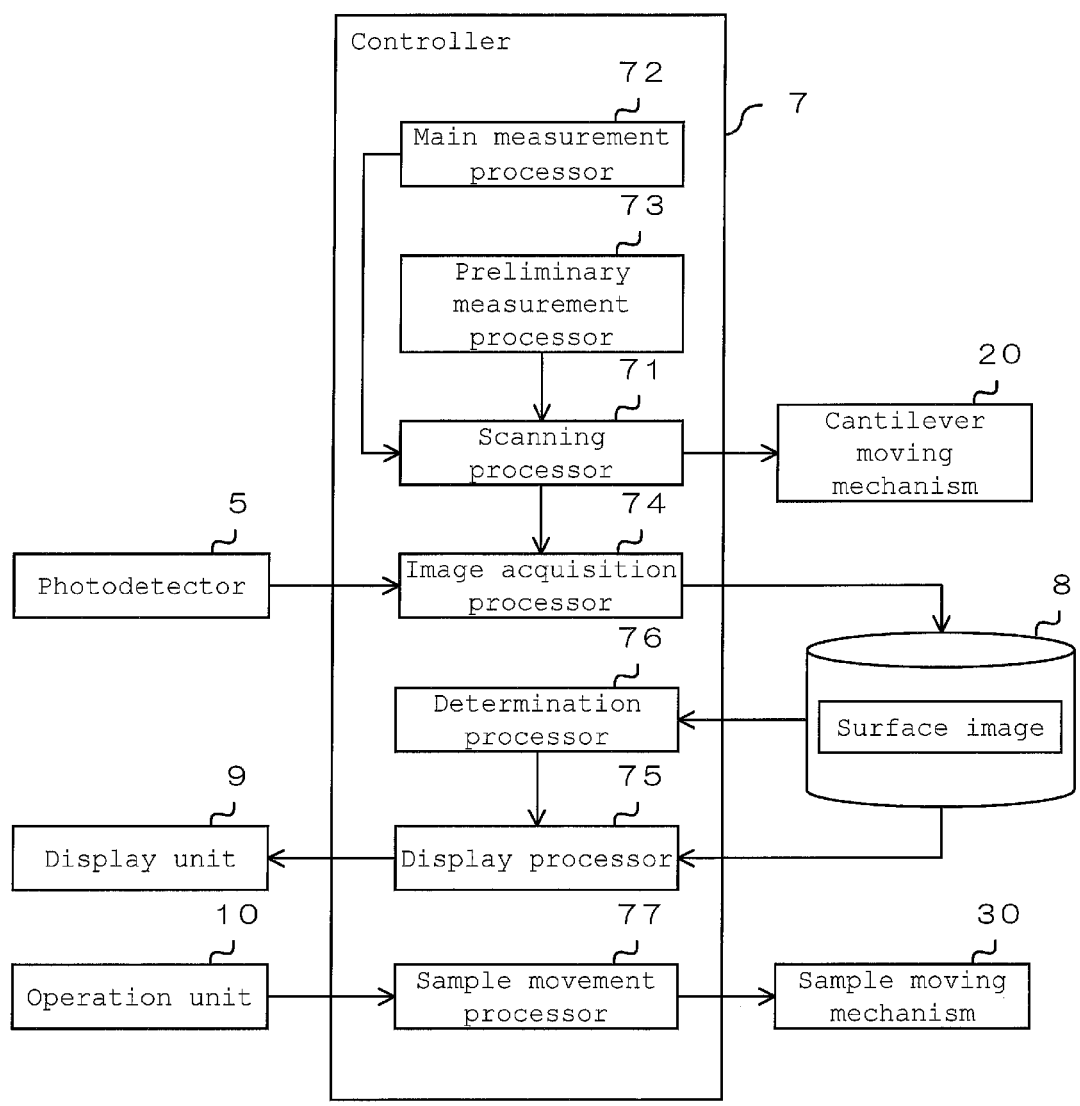
FIG. 3 is a block diagram illustrating an example of an electric configuration of the scanning probe microscope in FIG. 1.

FIG. 3 is a block diagram illustrating an example of an electric configuration of the scanning probe microscope in FIG. 1. The scanning probe microscope includes a controller 7, storage 8, a display unit 9, and an operation unit 10. Although not illustrated in FIG. 1, the scanning probe microscope also includes a cantilever moving mechanism 20 that moves the cantilever 1 in the X-direction and the Y-direction and a sample moving mechanism 30 that moves the sample stage 6 in the X-direction and the Y-direction.

For example, the controller 7 includes a CPU (Central Processing Unit). The CPU executes a program, which allows the controller 7 to function as a scanning processor 71, a main measurement processor 72, a preliminary measurement processor 73, an image acquisition processor 74, a display processor 75, a determination processor 76, and a sample movement processor 77. For example, the storage 8 is constructed with a RAM (Random Access Memory) or a hard disk. For example, the display unit 9 is constructed with a liquid crystal display. For example, the operation unit 10 is constructed with an operation key or a touch panel.

The scanning processor 71 controls the cantilever moving mechanism 20 to displace the cantilever 1 relative to the surface of the sample S. Consequently, the cantilever 1 can scan the surface of the sample S in the main scanning direction (X-direction) and the sub-scanning direction (Y-direction).

As described above with reference to FIG. 2, the scanning processor 71 controls the cantilever moving mechanism 20 such that the main scanning and the sub-scanning are alternately and repeatedly performed, so that the main measurement processor 72 performs the main measurement to acquire the surface image of the sample S in the measurement range R. Consequently, the surface image of the sample S over the whole measurement range R is obtained based on the detection signals of the photodetector 5 acquired at predetermined intervals D11 and D12 in the X-direction and the Y-direction.

The preliminary measurement processor 73 scans the cantilever 1 in a mode different from the main measurement before the main measurement is performed by the main measurement processor 72, thereby performing preliminary measurement to acquire the surface image of the sample S that is coarser than the surface image in the main measurement. Specifically, the surface image of the sample S that is coarser than the surface image in the main measurement can be acquired by performing at least one of processing of acquiring the detection signal from the photodetector 5 at intervals wider than the interval D11 during the main scanning and processing of sub-scanning at intervals wider than the interval D12.

The image acquisition processor 74 acquires the surface image of the sample S based on the detection signal from the photodetector 5 during the scanning performed by the scanning processor 71 in the main measurement or the preliminary measurement. At this point, luminance of each pixel of the surface image of the sample S has a value corresponding to intensity of the detection signal from the photodetector 5. The data of the surface image of the sample S acquired by the image acquisition processor 74 is stored in the storage 8.

The display processor 75 performs processing of displaying the surface image of the sample S acquired by the image acquisition processor 74. That is, the display processor 75 reads the data of the surface image of the sample S acquired by the image acquisition processor 74 from the storage 8, and causes the display unit 9 to display the data. Consequently, a worker can check the surface image of the sample S acquired by the main measurement or the preliminary measurement on the display unit 9.

The determination processor 76 performs processing of determining existence of an observation object in the surface image of the sample S acquired by the preliminary measurement. The observation object to be observed by the worker is included in a part of the sample S, and a part of the observation object becomes a protrusion or a recess with respect to a portion other than the observation object in the surface of the sample S. For this reason, in the surface image of the sample S acquired by the preliminary measurement, the portion of the observation object differs largely from other portions in luminance. Thus, the existence of the observation object can be determined based on the change in luminance of each pixel in the surface image of the sample S acquired by the preliminary measurement.

The sample movement processor 77 moves the position of the sample S in the X-direction or the Y-direction by controlling the sample moving mechanism 30 based on the operation unit 10 operated by the worker. Consequently, the position of the measurement range R can be moved on the surface of the sample S. In the case that the observation object does not exist in the surface image of the sample S acquired by the preliminary measurement, the worker operates the operation unit 10 to move the position of the sample S, whereby the worker can adjust the observation object such that the observation object falls within the measurement range R.

A determination result of the determination processor 76 is displayed on the display 9 by the display processor 75. The worker repeatedly executes the preliminary measurement while moving the position of the sample S until the observation object is determined to exist in the surface image of the sample S obtained by the preliminary measurement, and the main measurement is executed when the observation object is determined to exist. However, the main measurement or the preliminary measurement based on the determination result of the determination processor 76 may automatically be performed by the main measurement processor 72 or the preliminary measurement processor 73. The determination processor 76 may be omitted, and the worker may visually determine the existence of the observation object in the surface image of the sample S acquired by the preliminary measurement.

4. Example of Preliminary Measurement (1) First Example

Figure 4:
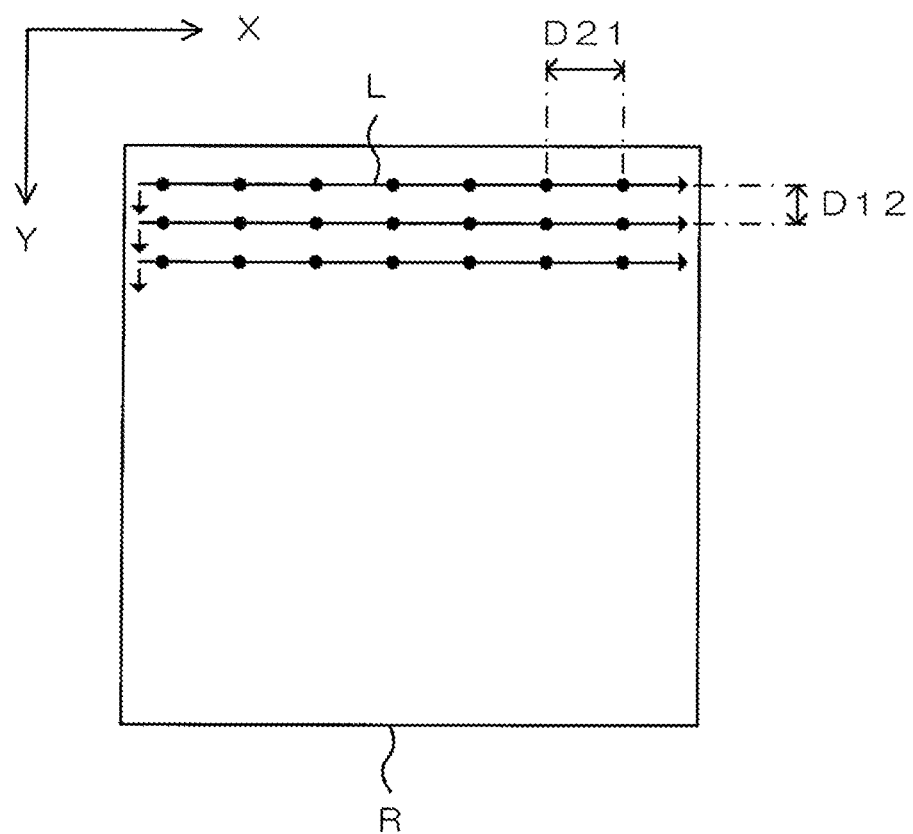
FIG. 4 is a view illustrating a first example of preliminary measurement.

FIG. 4 is a view illustrating a first example of the preliminary measurement. In the first example, the surface image of the sample S that is coarser than the surface image in the main measurement is acquired by acquiring the detection signal from the photodetector 5 at intervals D21 wider than the intervals D11 in the main measurement during the main scanning along the X-direction. On the other hand, the interval of the sub-scanning along the Y-direction is identical to the interval D12 in the main measurement.

(2) Second Example

Figure 5:
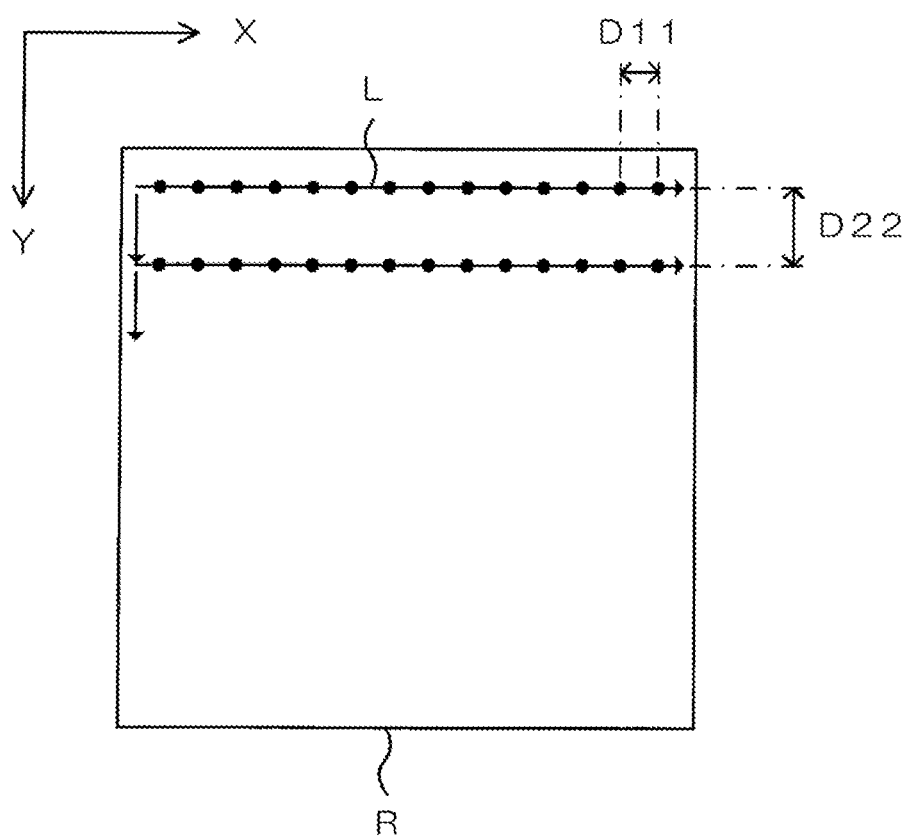
FIG. 5 is a view illustrating a second example of the preliminary measurement.

FIG. 5 is a view illustrating a second example of the preliminary measurement. In the second example, the surface image of the sample S that is coarser than the surface image in the main measurement is acquired by performing the scanning of the cantilever 1 along the Y-direction at intervals D22 wider than the intervals D12 in the main measurement. On the other hand, the interval in the main scanning along the X-direction is identical to the interval D11 in the main measurement.

(3) Third Example

Figure 6:
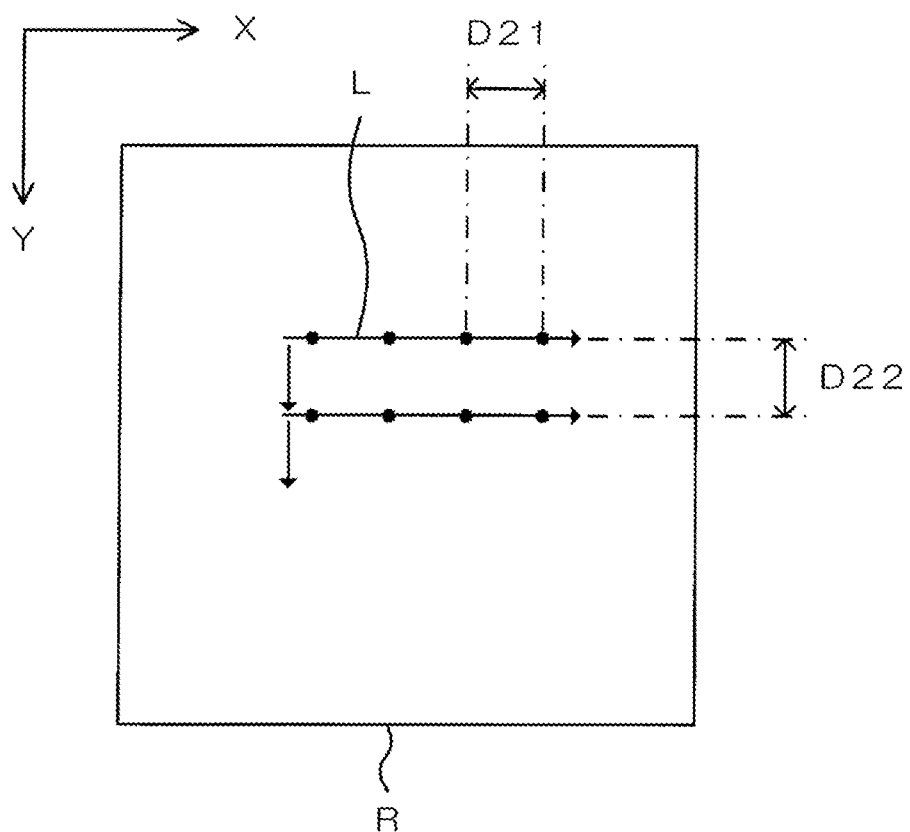
FIG. 6 is a view illustrating a third example of the preliminary measurement.

FIG. 6 is a view illustrating a third example of the preliminary measurement. In the third example, the scanning is started from a central portion of the measurement range R. For example, the central portion is preferably a range where each of widths in the X-direction and the Y-direction includes at least a range of 60% of the measurement range R. During the main scanning along the X-direction, the detection signal from the photodetector 5 is acquired at the intervals D21 wider than the intervals D11 in the main measurement. The cantilever 1 is scanned along the Y-direction at the intervals D22 wider than the intervals D12 in the main measurement. However, either one of the main scanning interval along the X-direction or the sub-scanning interval along the Y-direction may be identical to the interval D11 or D12 in the main measurement.

(4) Fourth Example

Figure 7:
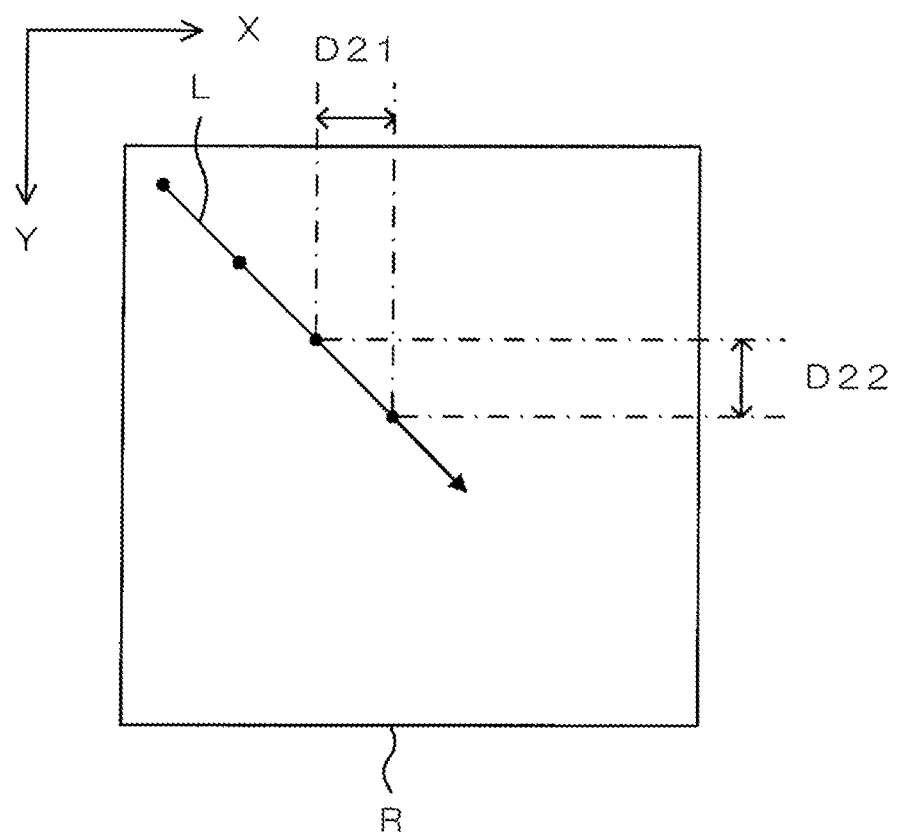
FIG. 7 is a view illustrating a fourth example of the preliminary measurement.

FIG. 7 is a view illustrating a fourth example of the preliminary measurement. In the fourth example, the cantilever 1 is simultaneously scanned in the X-direction and the Y-direction. That is, the cantilever 1 is displaced in the X-direction while simultaneously displaced in the Y-direction, so that the cantilever 1 is displaced along a direction inclined with respect to the X-direction and the Y-direction. At this point, the scanning is performed so as to pass through at least the central portion of the measurement range R. During the scanning of the cantilever 1, the detection signal from the photodetector 5 is acquired in the X-direction at the intervals D21 wider than the intervals D11 in the main measurement. The scanning of the cantilever 1 is performed in the Y-direction at the intervals D22 wider than the intervals D12 in the main measurement. However, either one of the main scanning interval along the X-direction or the sub-scanning interval along the Y-direction may be identical to the interval D11 or D12 in the main measurement.

(5) Fifth Example

Figure 8:
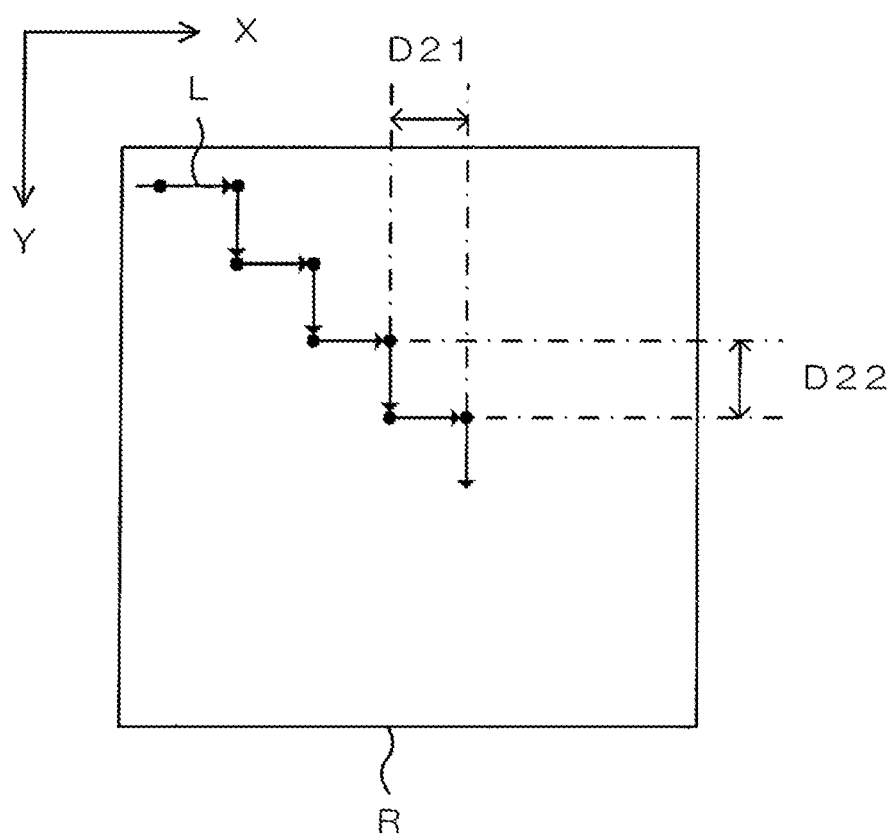
FIG. 8 is a view illustrating a fifth example of the preliminary measurement.

FIG. 8 is a view illustrating a fifth example of the preliminary measurement. In the fifth example, the processing of scanning the cantilever 1 in the Y-direction after scanning the cantilever 1 in the X-direction on the line L shorter than the length of the line L along the X-direction in the main measurement is repeated. After the main scanning in the X direction, the sub-scanning is performed in the Y-direction from that position, and the main scanning is performed again from the position after the sub-scanning. In this way, by alternately and continuously performing the main scanning and the sub-scanning, the scanning of the cantilever 1 is performed in a saw-tooth shape. At this point, the scanning is performed so as to pass through at least the central portion of the measurement range R. During the main scanning along the X-direction, the detection signal from the photodetector 5 is acquired at the intervals D21 wider than the intervals D11 in the main measurement. The cantilever 1 is scanned along the Y-direction at the intervals D22 wider than the intervals D12 in the main measurement. However, either one of the main scanning interval along the X-direction or the sub-scanning interval along the Y-direction may be identical to the interval D11 or D12 in the main measurement.

5. Function and Effect (1) In the present embodiment, in the preliminary measurement, the detection signal is acquired at the intervals D21 wider than the intervals D11 at which the detection signal is acquired along the X-direction in the main measurement (first, third to fifth examples), or the cantilever 1 is scanned at the intervals D22 wider than the intervals D12 at which the cantilever 1 is scanned in the Y-direction in the main measurement (second to fifth examples), which allows the surface image of the sample S that is coarser than the surface image in the main measurement to be acquired in a short time. Thus, the existence of the minute observation object in the surface image can be checked in a short time based on the coarse surface image of the sample S obtained by the preliminary measurement. For this reason, an observation time of the minute observation object can be shortened by performing the main measurement on the measurement range R where the observation object is determined to exist by the preliminary measurement.

(2) In the third example in FIG. 6, in the preliminary measurement, instead of acquiring the surface image of the sample S over the whole measurement range R, the surface image of the sample S is acquired in the central portion of the measurement range R, and the existence of the minute observation object can be checked in the surface image. Consequently, the preliminary measurement is performed in a short time as compared with the case that the surface image of the sample S is acquired over the whole measurement range R, so that the observation time of the minute observation object can further be shortened.

(3) In the fourth example in FIG. 7, the surface image of the sample S is acquired in the oblique direction with respect to the measurement range R by simultaneously scanning the cantilever 1 in the X-direction and the Y-direction, and the existence of the minute observation object can be checked in the surface image. Consequently, the preliminary measurement is performed in a short time as compared with the case that the surface image of the sample S is acquired over the whole measurement range R, so that the observation time of the minute observation object can further be shortened.

(4) In the fifth example in FIG. 8, the surface image of the sample S in the saw-tooth shape with respect to the measurement range R is acquired by repeating the processing of scanning the cantilever 1 in the Y-direction after scanning the cantilever 1 in the X-direction on a line L shorter than the length of one line L in the main measurement, and the existence of the minute observation object can be checked in the surface image. Consequently, the preliminary measurement is performed in a short time as compared with the case that the surface image of the sample S is acquired over the whole measurement range R, so that the observation time of the minute observation object can further be shortened.

(5) In the present embodiment, the existence of the minute observation object can automatically be determined in the surface image of the sample S by the determination processor 76 based on the surface image acquired in the preliminary measurement. Thus, a burden on the worker can be reduced as compared with the case that the worker visually checks the existence of the observation object. At this point, in the case that the determination processor 76 determines that the observation object exists in the surface image of the sample S, when the main measurement processor 72 performs the main measurement, the main measurement can automatically be performed in the measurement range R where the observation object is determined to exist, so that the burden on the worker can further be reduced.

What is claimed is:

1. A scanning probe microscope comprising:
   a cantilever relatively displaced along a surface of a sample;
   a light irradiator that emits light toward the cantilever;
   a photodetector that receives light reflected from the cantilever to output a detection signal corresponding to bending of the cantilever;
   a scanning processor that performs scanning by relatively displacing the cantilever in an X-direction and a Y-direction relative to the surface of the sample, the X-direction and the Y-direction intersecting each other;
   a main measurement processor that performs main measurement to acquire a surface image of a sample based on the detection signal in a measurement range of a plurality of lines by repeating, for each line, processing of scanning the cantilever at predetermined second interval in the Y-direction after acquiring the detection signal at predetermined first intervals while scanning the cantilever on a line having a predetermined length along the X-direction; and
   a preliminary measurement processor that performs preliminary measurement to acquire a surface image of the sample by acquiring the detection signal at intervals wider than the first intervals or scanning the cantilever in the Y-direction at intervals wider than the second intervals before the main measurement, the surface image of the sample being coarser than the surface image in the main measurement.

2. The scanning probe microscope according to claim 1, wherein the preliminary measurement processor starts the scanning from a central portion of the measurement range.

3. The scanning probe microscope according to claim 1, wherein the preliminary measurement processor simultaneously scans the cantilever in the X-direction and the Y-direction.

4. The scanning probe microscope according to claim 1, wherein the preliminary measurement processor repeats processing of scanning the cantilever in the Y-direction after scanning the cantilever in the X-direction on a line shorter than the predetermined length.

5. The scanning probe microscope according to claim 1, further comprising a determination processor that determines existence of an observation object in the surface image of the sample acquired by the preliminary measurement.

6. The scanning probe microscope according to claim 5, wherein the main measurement processor performs the main measurement when the determination processor determines that the observation object exists in the surface image of the sample.

* * * * *